UNITED STATES PATENT OFFICE.

HENRY A. AYLING, OF BOSTON, MASSACHUSETTS.

IMPROVED PROCESS FOR CHANGING, CURING, OR TREATING CAOUTCHOUC, &c.

Specification forming part of Letters Patent No. 42,633, dated May 10, 1864.

*To all whom it may concern:*

Be it known that I, HENRY A. AYLING, of Boston, in the county of Suffolk and State of Massachusetts, have invented a new and useful Process for Changing, Curing, or Treating Caoutchouc and its Compounds; and I do hereby declare that the following is a description of my invention sufficient to enable those skilled in the art to practice it.

My invention consists in a new process by which caoutchouc and its compounds are changed or cured, so that they are unaffected by changes of temperature, by contact with fatty and acid matters, and by exposure to the atmosphere, and so that strength and elasticity are increased. The change produced by the process is similar to that produced on caoutchouc by heat in the presence of sulphur, known as "vulcanization," except that there is no free sulphur left in the rubber, (chemically uncombined therewith, but mechanically held therein,) nor are there any other agents left in the rubber tending in the lapse of time to its injury or its destruction, and except also that the change is more permanent in its character and more uniform in its characteristics. The process is essentially a cold one, which can be successfully practiced at any degree of natural temperature, and may be described as consisting in bringing the caoutchouc into contact for a suitable time with a recently-discovered fluid solvent thereof (the same being a light fluid product of the distillation of the natural petroleum or rock-oil, said fluid being generally of a specific gravity varying from 0.600 to 0.750, and known in commerce as "carbon spirits," as well as by various other appellations, some of which are fanciful names and trade-marks adopted by manufacturers and dealers) when said fluid is combined with chloride of sulphur in the proportion of about one measure of the chloride of sulphur to about fifty measures of the carbon spirits. I do not, however, confine myself to the mixture of these ingredients in this precise proportion, as it may be somewhat varied therefrom, and yet be productive of like results.

In carrying out my process I prefer to obtain contact between the caoutchouc and the mixture by immersing the former in the latter, and in cases where the caoutchouc assumes the form of a sheet or band I pass it through the mixture with a regular continuous or intermittent movement. The time of immersion required to effect the change is, on the average, for thin sheet-rubber, about one minute, but is varied from this with the thickness of the caoutchouc and the amount of the chloride of sulphur in the mixture. Where the caoutchouc is quite thin less time is required, especially if the proportion of the chloride of sulphur equals or exceeds one-fiftieth of the whole mixture. When the goods are thick more time for immersion or contact and a less proportion of the chloride of sulphur may be employed. After the immersion in or contact with the mixture the caoutchouc is exposed to the action of the atmosphere, by which all redundance of the mixture is evaporated, and it will then be found that the caoutchouc is free from stickiness, and has received those valuable properties before named which characterize the cured from the native or pure caoutchouc, but that, unlike caoutchouc cured or changed in any other known way, there is no chemically uncombined sulphur to be found therein, or other active agents whose presence is made manifest by injurious action in the lapse of time. The described fluid compound engages with one of the constituents of natural caoutchouc, and when this constituent has taken up the necessary amount of the compound no more enters into the combination, as is proved by the fact that no further change takes place consequent upon successive intermittent contact or immersion, from which I conclude that any excess of the sulphur is made to disappear by decomposition or volatilization, or else that the caoutchouc refuses to take from the mixture any more of the sulphur than will enter into a strictly chemical combination with it. This process has the advantage of great economy, and entire control can be maintained over the action of the chemicals employed, so that uniformity of product is a necessary consequence, and the risk of injury or destruction by heat which attends the vulcanizing process avoided.

I claim—

The within-described process for curing caoutchouc and its compounds, the same consisting of their immersion in or their contact with a mixture of carbon spirits and chloride of sulphur, and afterward allowing them to dry, substantially as and for the purpose specified.

In witness whereof I have hereunto set my hand this 3d day of April, A. D. 1863.

HENRY A. AYLING.

In presence of—
J. B. CROSBY,
EDW. H. SEARS.